United States Patent [19]

Cohn et al.

[11] 4,331,977
[45] May 25, 1982

[54] PORTABLE TELEVISION CONTROLLER WITH ELECTRONIC SWITCHING

[75] Inventors: William E. Cohn, Skokie; Philip J. Nowaczyk, Chicago, both of Ill.

[73] Assignee: Zenith Radio Corporation, Glenview, Ill.

[21] Appl. No.: 216,692

[22] Filed: Dec. 15, 1980

[51] Int. Cl.³ .............................................. H04N 5/44
[52] U.S. Cl. .................... 358/188; 358/190; 455/231
[58] Field of Search ............... 358/190, 188; 315/94; 307/296 R; 455/230, 231, 343

[56] References Cited

U.S. PATENT DOCUMENTS

| | | | |
|---|---|---|---|
| 3,767,967 | 10/1973 | Luz | 315/94 |
| 3,787,757 | 1/1974 | Sheng | 323/275 |
| 3,878,326 | 4/1975 | Fitzgerald, Jr. | 358/198 |
| 4,004,085 | 1/1977 | Makino et al. | 358/188 |
| 4,005,344 | 1/1977 | Gaind et al. | 361/92 |
| 4,271,432 | 6/1981 | Suzuki et al. | 358/190 |

Primary Examiner—Richard Murray
Attorney, Agent, or Firm—Jack Kail

[57] ABSTRACT

An electronic switch is provided for use in a battery-powered portable television receiver which eliminates power supply current drain when the television receiver is turned off. Coupled transistors are rendered conductive by means of either a clock or a manually switched input signal to provide a direct voltage battery output to television receiver circuitry. Also disclosed in an electronic switch combination for selectively controlling the audio output for the entire television receiver either manually or automatically.

11 Claims, 2 Drawing Figures

PORTABLE TELEVISION CONTROLLER WITH ELECTRONIC SWITCHING

BACKGROUND OF THE INVENTION

This invention relates generally to an electronic switch for use in a television receiver, and particularly relates to an electronic switch in a battery-powered portable television receiver for either manual or automatic turn-on and turn-off operation.

The use of batteries in providing operating voltages for portable television receivers is extensive and on the increase with the increasing popularity of even smaller sized television receivers. Generally, portable television receivers employ rechargeable batteries which may be recharged during periods of non-use and exhibit long operating lifetimes. However, the high voltage requirements of even a small television receiver and the demands imposed upon a mobile piece of electronics equipment as sophiscated as a television receiver have placed strict operating requirements on the portable power supply.

Primary design objectives in this area include providing a system in which power demands on the portable power supply are reduced during operating periods and eliminated when the television receiver is turned off. Prior art systems have employed either mechanical or electronic switches. The former are generally large in size and difficult to integrate into the small confines of the portable television receiver while the latter, while physically small, suffer from current leakage when the television receiver is off. This is a particularly important consideration in the case of a lead-acid electrolytic battery for such storage devices are characterized by a minimum charge level, discharge below which renders the battery unrechargeable and in need of replacement. Another design objective in portable television receivers is the reduction in size of the AC-DC and on-off switches and associated circuitry. Prior art mechanical-type switches have become a more burdensome design consideration as portable television receiver size has diminished and features available therein have increased in number and sophistication.

One approach to reducing the power drain on a storage battery when the energized device does not require power is disclosed in U.S. Pat. No. 3,787,757 to Sheng. Therein is disclosed a high impedance control circuit which draws very little current while maintaining a regulator circuit inactive when the load circuit requires no external power. This circuit is designed for use with an electronic device requiring a periodic, load duty cycle operating voltage such as in a time piece. While capable of substantially reducing battery drain during inactive periods, this circuit, as stated in the specification, continues to draw an infinitesimal quiescent current used to inactivate a regulator circuit connected to the load. This quiescent current, of course, reduces energizing battery lifetime.

The prior art discloses numerous attempts to reduce power consumption in a portable television receiver. One such approach is disclosed in U.S. Pat. No. 3,878,326 to Fitzgerald wherein is discribed a television receiver capable of operating on either an alternating current line voltage or a direct current voltage supply in which power demands on the direct current supply are reduced thus prolonging portable battery lifetime. This is accomplished by a switching scheme in which a portion of the power supply is disabled during DC operation resulting in a reduction in losses in the secondary windings of the horizontal output transformer caused by current flow through the resistance of the secondary windings. Another approach to prolonging battery life in a portable television receiver is disclosed in U.S. Pat. No. 3,767,967 to Luz wherein is discribed a system which provides an instant-on feature for AC and DC operation while allegedly reducing current drain to extend battery lifetime. This is accomplished by removing kinescope filament heating in the "OFF" state of the television receiver. While both of these approaches are directed toward reducing power consumption during television receiver operation, neither is intended nor capable of reducing battery drain when the television receiver is "OFF".

Finally, U.S. Pat. No. 4,005,344 to Gaind et al. discloses a protection circuit for a storage battery energizing a television receiver which decouples the battery from the load when battery discharge drops below a predetermined level. Thus, by monitoring the battery potential and comparing that potential with a predetermined voltage level, the storage battery is protected against load circuit faults and discharge below its minimum safe charge level for the battery. This circuit also is intended to prevent excessive battery discharge while extending battery lifetime during television receiver operation.

The present invention, however, provides protection against the discharge of a storage battery energizing a portable television receiver by completely eliminating battery discharge while the television receiver is off. The present electronic switch also offers small size and an efficient means for controlling the audio output or the entire television receiver either manually or automatically.

OBJECTS OF THE INVENTION

Accordingly, it is an object of the present invention to provide a more efficient and compact on-off switch for a battery-powered television receiver.

It is another object of the present invention to provide an improved electronic switch for a portable television receiver for eliminating current leakage in the "OFF" state.

Still another object of the present invention is to provide an improved electronic switch combination for the automatic and manual operation of a portable television receiver.

A further object of the present invention is to provide an improved switch for turning a battery-powered portable television receiver on or off either manually or automatically by means of a timed signal.

BRIEF DESCRIPTION OF THE DRAWINGS

The appended claims set forth those novel features believed characteristic of the invention. However, the invention itself, as well as further objects and advantages thereof, will best be understood by reference to the following detailed description of preferred embodiments taken in conjunction with the accompanying drawings in which:

DESCRIPTION OF THE PREFERRED EMBODIMENTS

Figure 1:
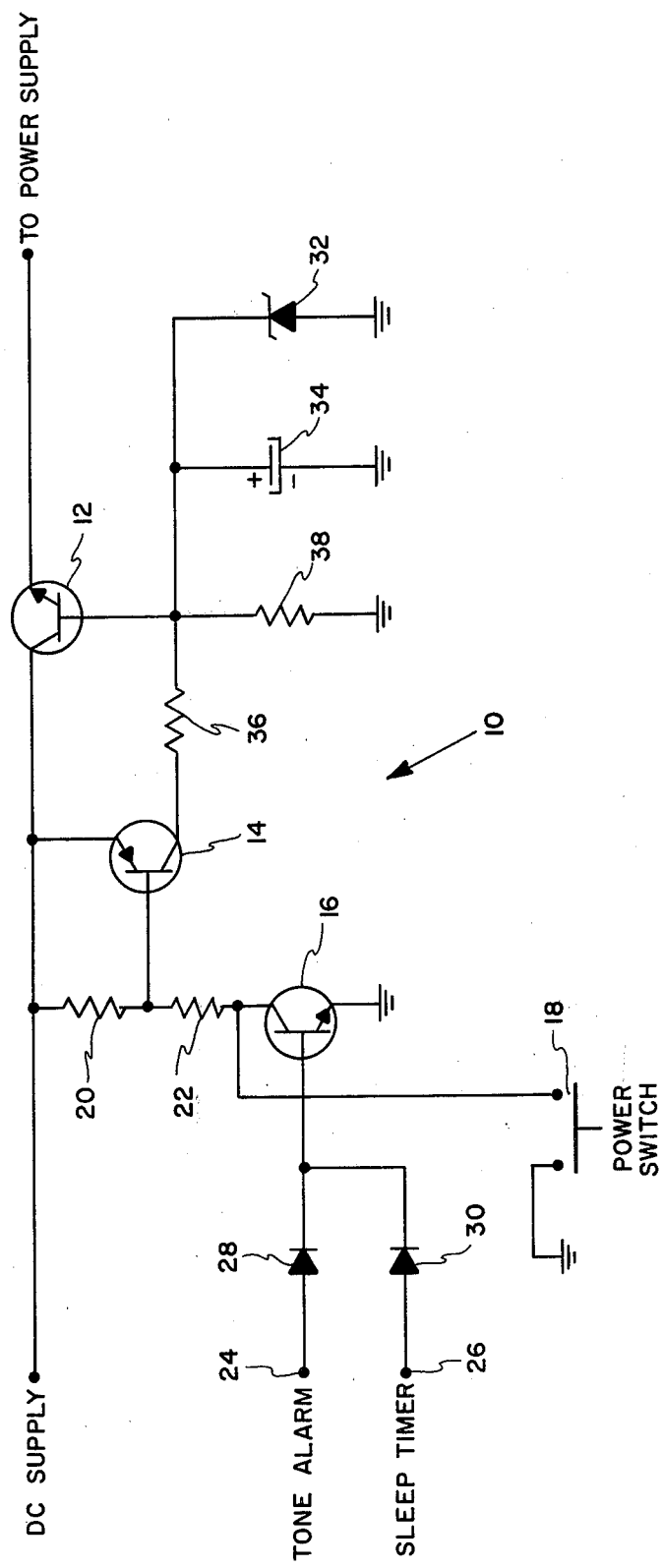
FIG. 1 shows a schematic drawing of a portable television controller with electronic switching in accordance with a preferred embodiment of the present invention.

Referring to FIG. 1, there is shown an electronic switch 10 for a portable television receiver in accordance with a preferred embodiment of the present invention. A DC input voltage is provided, generally by a storage battery, at a level of approximately 9 VDC. The portable television receiver also operates from an AC source which, because it does not form a part of the present invention, is not shown in the Figure. The output of electronic switch 10 is provided to a voltage regulator/power supply which energizes the audio and video circuitry (not shown) of the portable television receiver. For user convenience, two input control signals are provided to electronic switch 10 in the form of an alarm signal and a sleep timer signal. These two signals are a DC voltage level which in the preferred embodiment of the present invention is 1.5 VDC. These signals may be produced by a single DC level generator or two separate DC signal level generators of conventional design and do not form a part of the present invention. Coupled to these DC signal level generators is, of course, a clocking means which may also be of conventional design to permit the delivery to said electronic switch 10 of an alarm signal for television receiver turn-on and a sleep timer signal for television receiver turn-off after a predetermined time period. Also shown in FIG. 1 is a power switch 18 for manual turn-on and turn-off of the television receiver. Additional inputs may be provided to and additional outputs provided by electronic switch 10 in the portable television receiver environment but these various inputs and outputs do not form a part of the present invention and will not be further discussed.

In accordance with the present invention, a DC input is provided to switching transistor 12 from a conventional DC source such as a battery. Switching transistor 12 controls whether the DC input is provided to the portable television receiver's voltage regulator/power supply (not shown) depending upon whether it is in a conducting or non-conducting state. The state of switching transistor 12, in turn, is determined by control transistor 16 in combination with coupling transistor 14.

In the alarm mode of operation, an alarm signal is provided to alarm input terminal 24 by means of a DC voltage level generator in combination with a clocking means as previously discussed. The alarm signal is provided to the base of control transistor 16 via diode 28 which prevents the transmission of a sleep timer signal (to be discussed) to the alarm signal generator circuit (not shown). The collector of control transistor 16 is connected to the DC supply via resistors 20 and 22 which form a voltage divider network. The emitter of control transistor 16 is coupled to neutral ground potential. Thus, when the base voltage of control transistor 16 increases by virtue of the alarm signal input such that the base-emitter voltage required for transistor turn-on is realized, transistor 16 begins conducting. With control transistor 16 conducting current is pulled through resistor 22 from the base of coupling transistor 14 which is then turned on. The value of resistor 20 is selected so that the base-emitter voltage of coupling transistor 14, when resistor 22 is not grounded, is such that coupling transistor 14 is turned off.

With resistor 22 grounded via control transistor 16 and coupling transistor 14 thus rendered conductive, current is provided to the base of switching transistor 12 which is thereby turned on. With switching transistor 12 conducting the DC input voltage is provided directly to the portable television receiver's voltage regulator/power supply. It can be seen from FIG. 1 that a sleep timer input signal applied to terminal 26 would have a similar effect in turning on switching transistor 12 thus energizing television receiver circuitry. Sleep timer signal diode 30 is incorporated to prevent application of the alarm signal input to sleep timer circuitry (not shown).

Power switch 18 is incorporated to provide a manual turn-on/turn-off capability for the portable television receiver. When power switch 18 is engaged the collector of control transistor 16 is grounded resulting in current being pulled through resistor 22 thus turning on coupling transistor 14. This causes switching transistor 12 to be turned on and couples the DC power supply to the portable television receiver voltage regulator/power supply. One terminal of power switch 18 is connected to neutral ground potential causing the collector of control transistor 16 to be grounded when the power switch is engaged resulting in turn-on of the portable television receiver via the DC power supply.

Coupled to the collector of coupling transistor 14 is current limiting resistor 36 which in combination with Zener diode 32 limits the DC voltage provided to television receiver circuitry. In the preferred embodiment of present invention the values of current limiting resistor 36 and Zener diode 32, which is coupled to neutral ground potential, are selected to limit the DC provided to television receiver circuitry to 10 VDC. This voltage clamping capability permits the electronic switch of the present invention to be used in powering a portable television receiver by means of an automobile battery in which the 9 VDC output may climb as high as 14 VDC. The clamping provided by current limiting resistor 36 and Zener diode 32 thus enables the portable television receiver, particularly its audio circuitry, to operate safely in this environment. Filter capacitor 34 removes noise from the DC signal provided to television receiver circuitry generated by the clamping circuit. Grounded resistor 38 provides an alternate path to neutral ground potential when Zener diode 32 is off.

Figure 2:
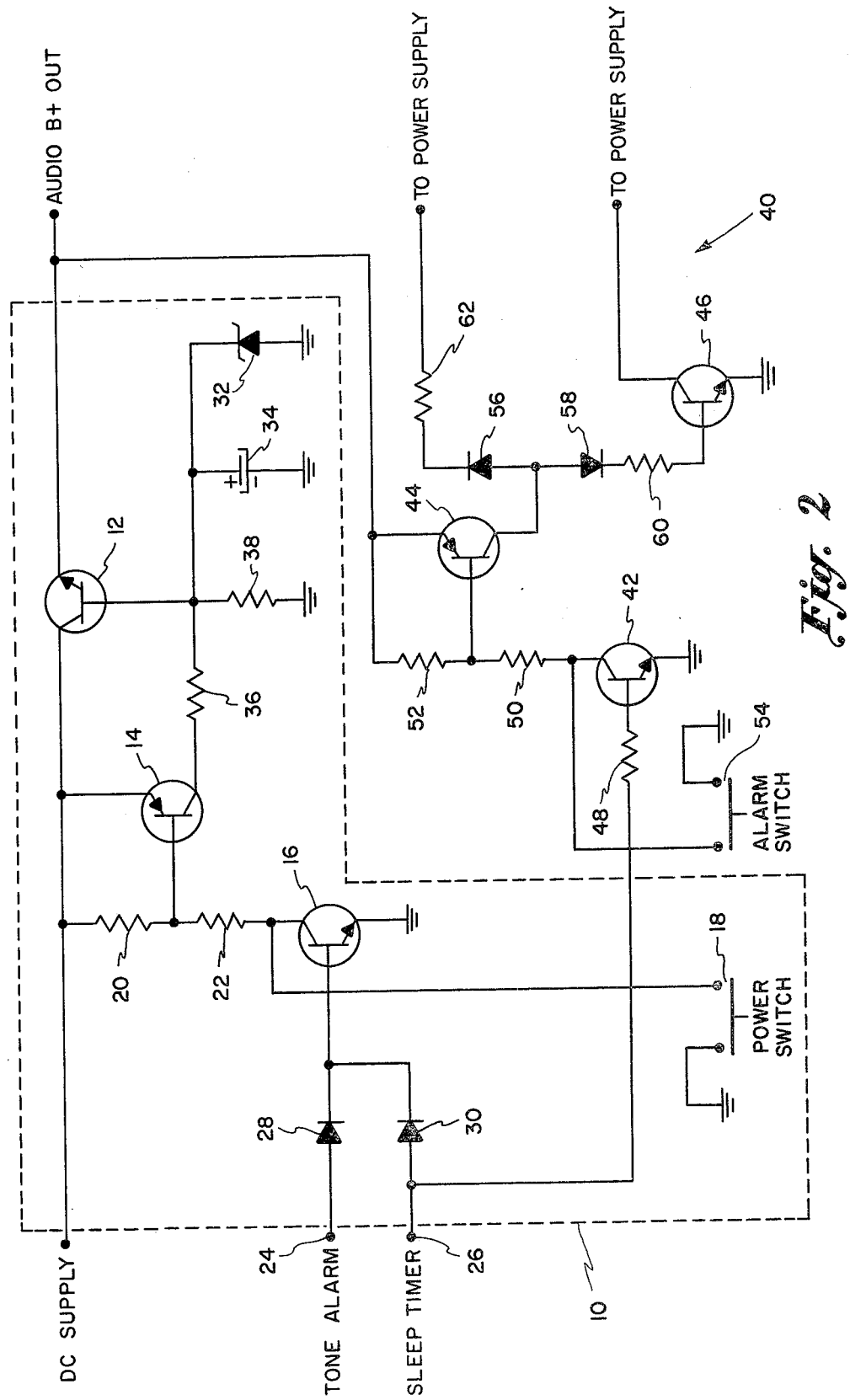
FIG. 2 is a schematic diagram of an electronic switching network for a portable television receiver capable of various modes of automatic and manual operation in accordance with a preferred embodiment of the present invention.

Referring to FIG. 2, there is shown another preferred embodiment of the present invention in which the basic electronic switch configuration 10 has been duplicated in providing dual control over the audio and video circuitry of the portable television receiver. The electronic switch 10 of FIG. 1 is duplicated identically in FIG. 2, however, the DC output of electronic switch 10 is now provided to audio circuitry and to a second electronic switch assembly at point "A". Thus, and alarm signal input applied to alarm terminal 24 activates electronic switch 10, the output of which is provided not only to television receiver audio circuitry but also to a second control transistor 42 and second coupling transistor 44. Similarly, a sleep timer signal provided to input terminal 26 or the engagement of power switch 18 will activate electronic switch 10 providing a DC signal to portable television audio circuitry in the form of a B+ voltage and to the second electronic switch assembly of portable television receiver controller 40. In addition, a sleep timer signal is provided directly to the base of control transistor 42 which, in combination with alarm switch 54, permits only the audio circuitry of the audio and video circuitry of the portable television receiver to be selectively energized for a predetermined time period prior to automatic shut-off. The operation of portable television receiver controller 40 in providing this capability will be explained presently.

With a DC output signal provided to point "A" by electronic switch 10, engagement of alarm switch 54 grounds the collector of second control transistor 42 causing current to be pulled through second coupling transistor 44. Resistor 50 provides current limiting resistance to prevent excessive current passing through second coupling transistor 44. Resistor 52 across the base-emitter junction of second coupling transistor 44 ensures that transistor 44 is non-conducting when resistor 50 is not grounded. Resistor 48 acts as a current limiter for the sleep timer signal provided to the base of second control transistor 42.

With the alarm switch engaged or with a sleep timer signal provided to the base of second control transistor 42, second coupling transistor 44 is rendered conducting and a DC voltage is applied to point "B". At point "B" the output of second coupling transistor 44 is split into two paths to drive the video circuitry of the portable television receiver. These two DC signal paths are necessitated by the unique voltage regulator/power supply circuitry of the portable television receiver with which the portable television receiver controller 40 is utilized. The present invention will operate equally as well if the base of transistor 46 were connected directly to point "B" and associated circuit components such as the steering diodes and current limiting resistors were eliminated. Steering diodes 56 and 58 and current limiting resistors 60 and 62 are necessitated by the unique voltage regulator/power supply circuitry in the portable television receiver with which controller 40 interfaces. The outputs of portable television receiver controller 40 are provided at points "C" and "D" with output transistor 46 utilized to amplify the output signal at point "D".

Controller 40 thus permits flexible utilization of a portable television receiver operated by means of a DC voltage source. An alarm signal may be used to turn-on either just the audio portion of the television receiver or may be utilized to turn-on both audio and video circuitry of the portable television receiver. If a clock signal generator (not shown) provides an alarm signal to terminal 24, audio circuitry will be activated and, if alarm switch 54 is engaged, video circuitry will also be activated. If alarm switch 54 is not engaged only audio circuitry will be energized. Similarly, if a clock signal generator provides a sleep timer signal to terminal 26, audio circuitry will be activated as will video circuitry. If alarm switch 54 is engaged with an alarm signal applied to terminal 24, only audio circuitry will be activated with the video portion of the portable television receiver turned off. Engagement of power switch 18 turns on both audio and video circuits in the portable television receiver.

In a practical example of the present invention, the following values are assigned to various components of the portable television receiver controller with electronic switching to provide the previously discussed switching functions in controlling the various operating modes of a portable television receiver operated from a DC power supply:

| Reference No. | Preferred Value |
| --- | --- |
| 20 | 100 Kilohms |
| 22 | 18 Kilohms |
| 34 | 1 Microfarad |
| 36 | 220 Ohms |
| 38 | 39 Kilohms |
| 48 | 10 Kilohms |
| 50 | 18 Kilohms |
| 52 | 47 Kilohms |
| 60 | 10 Kilohms |
| 62 | 10 Kilohms |

There has thus been shown a portable television receiver controller with electronic switching which offers smaller size, increased current handling capability and essentially zero current leakage from a portable power supply. This electronic switch configuration not only prolongs the life of the portable power supply, e.g., a battery, but also permits the user to exercise greater control with enhanced flexibility over the various operating modes of the portable television receiver.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a portable television receiver operable alternatively from a first source of alternating current line derived voltage and from a second lower, direct current voltage source including a battery, an electronic switching circuit for turning on said television receiver automatically by means of a first timed direct current signal provided by clock signal generating means or manually comprising:
   first transistor switching means coupling said second voltage source to television receiver circuitry, said first transistor switching means including a collector electrode coupled to said second voltage source, an emitter electrode coupled to said television receiver circuitry and a base electrode;
   second transistor control means having a collector electrode coupled via a plurality of resistive means to the junction of said second voltage source and said first switching means, an emitter electrode coupled to neutral ground potential and a base electrode coupled to said clock signal generating means for receiving said first timed direct current signal;
   third transistor coupling means having a collector electrode coupled to the base electrode of said first switching means, an emitter electrode coupled to the junction of said second voltage source and the collector of said first switching means, and a base electrode coupled to said resistive means; and
   manual switch means coupling said resistive means to neutral ground potential.

2. An electronic switching circuit as in claim 1 further including means for generating a second timed direct current signal for a predetermined time interval, said signal generating means being coupled to the base of said second control means for operating said portable television receiver by means of said direct current voltage source for said predetermined time interval followed by the removal of said second timed direct current signal and the turning off of said television receiver.

3. An electronic switching circuit as in claim 1 further comprising clamping means coupling the junction of the base electrode of said first switching means and the collector electrode of said third coupling means to neutral ground potential so as to limit the operating voltage provided to said television receiver circuitry.

4. An electronic switching circuit as in claim 3 wherein said clamping means comprises a current limiting resistor in series with a Zener diode.

5. In a portable television receiver operable alternatively from a first source of alternating current line derived voltage and from a second lower, direct current voltage source including a battery, an electronic switching circuit for tuning on said television receiver automatically by means of a first timed direct current signal or by means of a second timed direct current signal of a predetermined duration for operating said portable television receiver for a predetermined time interval followed by removal of said second timed direct current signal and the turning off of said television receiver or for manually turning said portable television receiver on and off, said first and second timed direct current signals provided by clock signal generating means, said electronic switching circuit comprising:
   transistor switching means coupling said second voltage source to television receiver circuitry, said first transistor switching means including a collector electrode coupled to said second voltage source, an emitter electrode coupled to said television receiver circuitry and a base electrode;
   transistor control means having a collector electrode coupled via a plurality of resistive means to the junction of said second voltage source and said first switching means, an emitter electrode coupled to neutral ground potential and a base electrode coupled to said clock signal generating means for receiving said first and second timed direct current signals;
   transistor coupling means having a collector electrode coupled to the base electrode of said first switching means, an emitter electrode coupled to the junction of said second voltage source and the collector of said first switching means, and a base electrode coupled to said resistive means;
   clamping means coupling the junction of the base electrode of said first switching means and the collector electrode of said coupling means to neutral ground potential so as to limit the operating voltage provided to said television receiver circuitry; and
   manual switching means coupling said resistive means to neutral ground potential when engaged for manually turning on said portable television receiver.

6. An electronic switching network as in claim 5 further including a second timed direct current signal provided by said clock signal generating means to the base electrode of both transistor control means for a predetermined time period whereby said audio circuitry, or said audio circuitry and said video circuitry with said alarm switch means disengaged, is energized by means of said second direct current voltage source for said predetermined time interval followed by the removal of said second timed direct current signal and the turning off of said television receiver.

7. In a portable television receiver having audio and video signal processing circuitry operable alternatively from a first source of alternating current line derived voltage and from a second lower, direct current voltage source including a battery, an electronic switching network for selectively turning on said audio and video signal processing circuitry automatically by means of a first direct current signal provided by clock signal generating means or manually comprising:
   first switching means connecting said second voltage source to said audio circuitry and second switching means connecting said first switching means to said video circuitry, said first and second switching means each including:
      transistor control means having a base electrode connected to said clock signal generating means for receiving said first timed direct current signal, an emitter electrode connected to neutral ground potential and a collector electrode for generating control signals in response to said first timed direct current signal;
      transistor switching means having a base electrode for receiving said control signals, a collector electrode coupled to said second voltage source in said first switching means and to said video circuitry in said second switching means, and an emitter electrode coupled to said audio circuitry and to the base electrode of the transistor control means of said second switching means in said first switching means and coupled to neutral ground potential in said second switching means; and
      transistor coupling means coupling said transistor control means to said transistor switching means for providing said first control signal thereto;
   power switch means coupling the collector of said transistor control means of said first switching means to neutral ground potential when engaged for manually turning on said portable television receiver by rendering said transistor coupling means and, in turn, said transistor switching means conductive thus directly energizing said audio circuitry and energizing said video circuitry via said second switching means; and
   alarm switch means coupling the collector of said transistor control means of said second switching means to neutral ground potential when engaged permitting only said audio circuitry to be energized upon the receipt by said first switching means of a first timed direct current signal from said clock signal generating means.

8. An electronic switching network as in claim 7 further comprising clamping means coupling the junction of the base electrode of said transistor switching means and the collector electrode of said transistor coupling means in said first switching means to neutral ground potential so as to limit the operating voltage provided to said television receiver.

9. An electronic switching network as in claim 8 wherein said clamping means comprises a current limiting resistor in series with a Zener diode.

10. An electronic switching network as in claim 7 wherein said transistor control means and said transistor coupling means comprise coupled NPN and PNP transistors, respectively, with said transistor switching means comprising NPN transistors.

11. In a portable television receiver having audio and video signal processing circuitry operable alternatively from a first source of alternating current line derived voltage and from a second lower, direct current voltage source including a battery, an electronic switching network for selectively turning on said television receiver automatically by means of a first direct current signal, for operating said television receiver for a predetermined time period by means of a second direct current signal followed by removal of said second direct current signal and the turning off of said television receiver, or for manually turning said television receiver on and off, wherein the control over said television provided by said switching network may selectively be excerised over only said audio signal processing circuitry or over both said audio and video signal processing circuitry, with said first and second direct current signals provided by clock signal generating means, said electronic switching means comprising:

first switching means connecting said second voltage source to said audio circuitry and second switching means connecting said first switching means to said video circuitry, said first and second switching means each including:

transistor control means having a base electrode connected to said clock signal generating means for receiving said first and second timed direct current signals, an emitter electrode connected to neutral ground potential and a collector electrode for generating control signals in response to said first and second timed direct current signals;

transistor switching means having a base electrode for receiving said control signals, a collector electrode coupled to said second voltage source in said first switching means and to said video circuitry in said second switching means, and an emitter electrode coupled to said audio circuitry and to the base electrode of the transistor control means of said second switching means in said first switching means and coupled to neutral ground potential in said second switching means; and transistor coupling means coupling said transistor control means to said transistor switching means for providing said first and second control signals thereto;

clamping means coupling the junction of the base electrode of said transistor switching means and the collector electrode of said transistor coupling means in said first switching means to neutral ground potential so as to limit the operating voltage provided to said audio circuitry and to said second switching means;

power switch means coupling the collector of said transistor control means of said first switching means to neutral ground potential when engaged for manually turning on said portable television receiver by rendering said transistor coupling means and, in turn, said transistor switching means conductive thus directly energizing said audio circuitry and energizing said video circuitry via said second switching means; and alarm switch means coupling the collector of said transistor control means of said second switching means to neutral ground potential when engaged permitting only said audio circuitry to be energized upon the receipt by said first switching means of a first timed direct current signal from said clock signal generating means.

* * * * *